United States Patent [19]

Levy et al.

[11] 4,279,600

[45] Jul. 21, 1981

[54] ROD WRENCHING TABLE

[75] Inventors: Robert M. Levy; P. Jeffrey Matire, both of Guymon, Okla.

[73] Assignee: Sam's Well Service, Inc., Guymon, Okla.

[21] Appl. No.: 83,292

[22] Filed: Oct. 10, 1979

[51] Int. Cl.³ .............................................. G09B 9/00
[52] U.S. Cl. .................................................... 434/219
[58] Field of Search ................... 35/10, 13; 46/27, 28, 46/29; 166/77.5, 85, 98

[56] References Cited

U.S. PATENT DOCUMENTS

| | | |
|---|---|---|
| 1,613,461 | 1/1927 | Johnson . |
| 2,031,931 | 2/1936 | Church . |
| 2,199,738 | 5/1940 | Bowles . |
| 2,609,638 | 9/1952 | Lindenmeyer ............................ 46/29 |
| 2,610,028 | 9/1952 | Smith . |
| 3,168,793 | 2/1965 | Gibson ..................................... 46/28 |
| 3,475,038 | 10/1969 | Matherne . |

Primary Examiner—Anton O. Oechsle
Attorney, Agent, or Firm—Laney, Dougherty, Hessin & Beavers

[57] ABSTRACT

A training apparatus for training persons to assemble sucker rods to be placed in an oil well includes a frame. A first sucker rod portion is fixedly attached to and extends upwardly from the frame. A second sucker rod portion has an upper end connected to a resiliently extendable coil spring which in turn has its upper end connected to a swivel attached to the frame. The second sucker rod portion is resiliently and rotatably suspended above the first sucker rod portion. The resiliently extendable coil spring is so constructed that it may be extended by downward force so as to engage the first and second sucker rods through a threaded female coupling. This simulates the conditions present in the oil field when the sucker rods are being assembled and permits persons to practice the assembly and disassembly of sucker rods.

8 Claims, 1 Drawing Figure

ROD WRENCHING TABLE

BACKGROUND OF THE INVENTION

1. Field of the Invention

This invention relates generally to training apparatus, and more particularly, but not by way of limitation, to a rod wrenching table for use in training persons to assemble sucker rods connected to a pump to be lowered into an oil well.

2. Description of the Prior Art

After an oil well has been completed, a downhole pump is often installed in the well. This downhole pump is a reciprocating plunger pump which is actuated by a string of sucker rods connected between the pump and a reciprocating horse's head located on the ground surface. The sucker rods are solid steel rods having threaded pin connections at both ends, with a square wrenching shoulder adjacent the pin connection. Adjacent sucker rods are connected by means of a threaded female coupling which is often referred to as a rod box.

The installation of a downhole pump of this type in an oil well is normally carried out as follows. Initially the pump and the sucker rods are all located on the ground surface before they are inserted into the oil well. The lower end of a first sucker rod is connected to a coupling attached to the pump. The upper end of the first sucker rod is then engaged with an elevator. An elevator is a device which engages a flared shoulder below the square wrenching shoulder so as to support the sucker rod. The elevator is connected to a block and tackle assembly located on the rigging above the well so that the elevator and sucker rods may be lowered and raised by the block and tackle assembly.

The pump and the first sucker rod are then lowered into the oil well until the first elevator engages the upper end of the well casing. At this point it is necessay to attach a second sucker rod to the first sucker rod.

The two sucker rods are connected by means of a coupling or rod box as previously mentioned. Typically, the coupling or rod box will already be made up upon one or the other of the first and second sucker rods.

A second elevator is engaged with the upper end of the second sucker rod and the second sucker rod is lifted to a position slightly spaced above the upper end of the first sucker rod.

Then first and second hammer rod wrenches, as are familiar to those skilled in this art, are engaged with the square hammering shoulders of the upper end of the first rod and the lower end of the second sucker rod. The second sucker rod is resiliently suspended from the rigging so that a downward force may be exerted upon the second sucker rod thereby pulling it into engagement with the first sucker rod. It will be understood that this engagement is through the means of the rod box. The second sucker rod is then threadedly connected to the first sucker rod by means of the interconnecting rod box.

The most difficult part of assembling these sucker rods is to learn to assemble them very quickly. This is important because a great number of rods are required to be assembled when intalling a pump, and downtime on the oil well is very costly. After the threaded engagement between the first and second sucker rods is initiated, the second sucker rod is spun by means of the second hammer rod wrench. This spinning is continued until the shoulders of the pin and box connections are mated. Then, it is necessary to hammer the two sucker rods together to ensure that the threaded joint is made up tightly. This hammering is accomplished by means of the hammer rod wrenches.

The hammer rod wrenches include a spring loaded swivel head which allows the worker using the wrenches to back off approximately 30° on the wrenches without actually turning the rod, then to slam the wrenches back together so that the wrench builds up a substantial momentum before force is actually transferred to the sucker rod, thereby providing a hammering effect which tightly wrenches the pin and box connections together.

Similarly, this hammer effect is used to break the threaded connections when the rods are being disassembled as the pump is being retrieved from the well. Once the threaded connection is broken, then the second hammer rod wrench is used to spin the uppermost rod at the connection so as to rapidly unscrew the pin and box connections.

The apparatus located at the oil well site, and the methods just described, are old in the art, and the apparatus and tools mentioned are well known to those skilled in the art.

A problem encountered in the assembly and disassembly of sucker rods is that a considerable degree of skill is required in order to be able to properly and rapidly assemble and disassemble the sucker rods. This is a skill which can only be obtained by practice and experience. The problem is that customers of service companies who install these pumps are reluctant to let untrained personnel work on their equipment, and at the very least are dissatisfied when delays are caused because of novice personnel who are not able to rapidly conduct the assembly or disassembly job.

Prior to the present invention, there has been no satisfactory manner of training personnel to accomplish this task other than by on the job training with the accompanying difficulties mentioned.

The present invention provides a training apparatus which very closely simulates the conditions present in the field when assembling and disassembling sucker rods. By means of this training apparatus, personnel may be trained before they ever go into the field, so that they will be relatively skilled in this task the first time they actually go into the field to do a job for a customer.

SUMMARY OF THE INVENTION

The rod wrenching table of the present invention includes a table having a central support column extending upward therefrom. An intermediate beam is connected across the upper end of the support column and first and second outer beams are connected to the intermediate beam. First, second, third and fourth rod wrenching simulators each include a lower simulator portion connected to the top of the table and include an upper simulator portion connected to one of the ends of the first and second outer beams. The rod wrenching table therefore provides four stations at which trainees may practice the art of assembling and disassembling sucker rods.

The lower simulator portion of each of the rod wrenching simulators includes a first sucker rod portion having a threaded pin connection at an upper end thereof. This first sucker rod portion is fixedly attached to the table top.

The upper simulator portion of each of the rod wrenching simulators includes a swivel means attached to one of said first and second outer beams, a vertically extendable coil spring connected to the swivel means, and a second sucker rod portion connected to the coil spring and having a threaded pin connection at a lower end thereof.

This construction allows the second sucker rod portion to be rotated thereby simulating the field condition wherein the sucker rod suspended from the oil well rigging may be rotated. Furthermore, the coil spring allows the second sucker rod portion to be pulled downward to engage the first sucker rod portion in a manner simulating the resilient suspension of sucker rods from the oil well rigging in the field.

It is therefore, an object of the present invention to provide a training apparatus for training persons to assemble and disassemble sucker rods and similar elongated threaded members.

And another object of the present invention is to provide a rod wrenching table including a rod wrenching simulator.

Yet another object of the present invention is to provide a rod wrenching simulator having a lower simulator portion simulating a sucker rod in place within an oil well and having an upper simulator portion, simulating a second sucker rod suspended from the oil well rigging so that it may be engaged with the first sucker rod portion.

Other and further objects, features and advantages of the present invention will be readily apparent to those skilled in the art upon a reading of the following disclosure in conjunction with the drawing.

BRIEF DESCRIPTION OF THE DRAWING

The drawing presents an isometric view of the rod wrenching table of the present invention with the individual rod wrenching simulators being shown in various assembled and disassembled orientations.

DETAILED DESCRIPTION OF THE PREFERRED EMBODIMENTS

Figure 1:
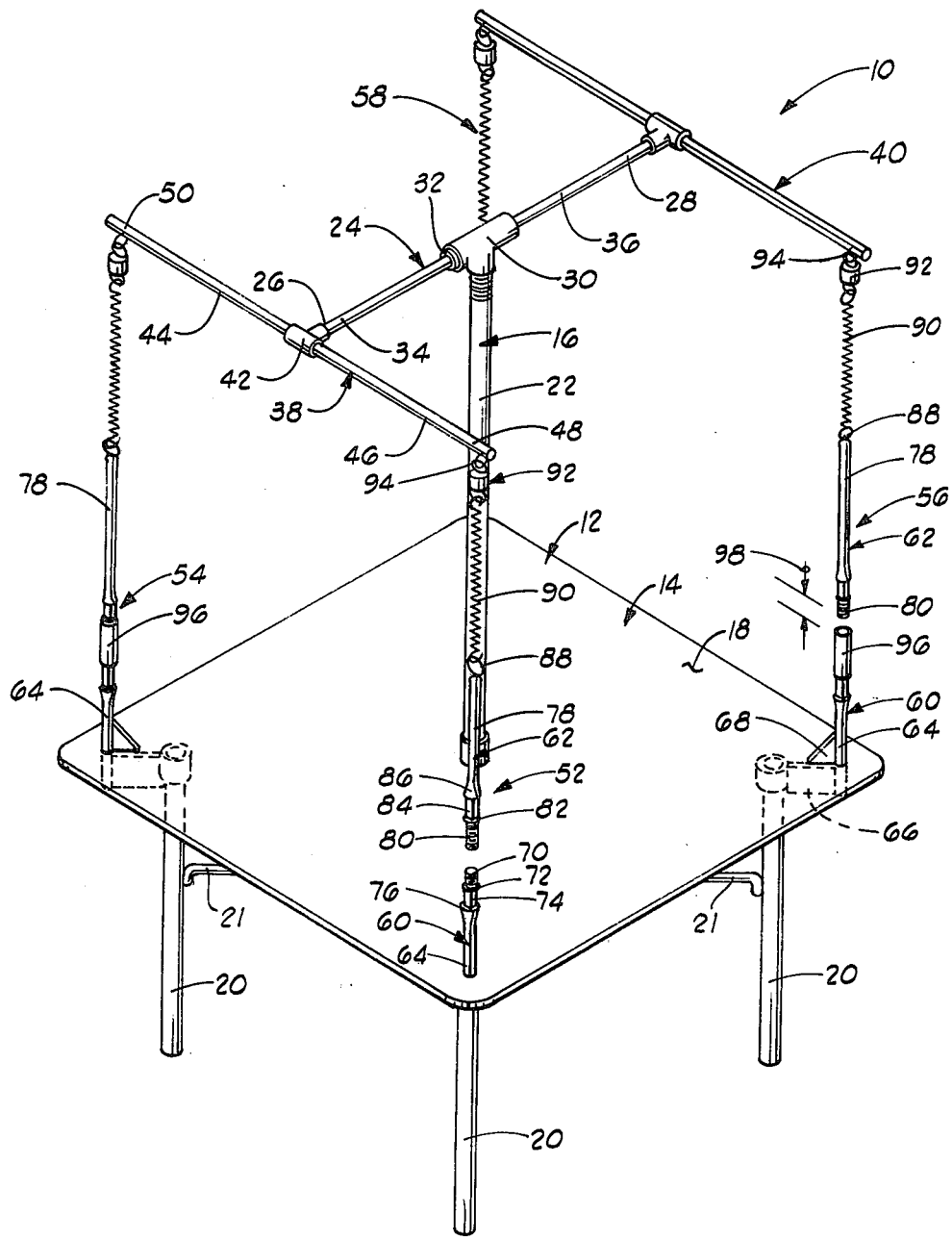

Referring now to the drawing, the training apparatus of the present invention is shown and generally designated by the numeral 10. The training apparatus 10 may also be referred to as a rod wrenching table.

The training apparatus includes a frame 12 having a lower frame portion 14 and an upper frame portion 16.

The lower frame portion 14 may be further described as being a table 14 having a planar horizontal top member 18 with a plurality of ground engaging support legs 20 extending downwardly therefrom. The legs 20 are connected by crossbracing 21.

The upper frame portion 16 includes a central column 22 extending upward from table top 18. An intermediate beam 24 is connected to the upper end of column 22 and includes first and second ends 26 and 28 extending horizontally from column 22. The intermediate beam 24 is made up of a threaded T-pipe fitting 30 and a threaded reducer coupling 32 on each end thereof connected to intermediate beam pipe members 34 and 36.

Upper frame portion 16 further includes first and second outer beams 38 and 40, respectively, connected to the first and second ends 26 and 28, respectively, of intermediate beam 24. First outer beam 38 comprises a threaded T-pipe fitting 42 and first and second pipe portions 44 and 46. Second outer beam 40 is similarly constructed.

As is shown in the drawing, the column 22 is of larger diameter than the pipe members making up intermediate beam 24 and first and second outer beams 38 and 40. Column 18 is preferably a 1¾-inch diameter pipe and other pipe members are preferably ¾-inch diameter pipe.

First outer beam 38 includes first and second ends 48 and 50, respectively. Located between first end 48 and the table top 18 is a first rod wrenching simulator 52. Located between second end 50 and table top 18 is a second rod wrenching simulator 54. Similarly, third and fourth rod wrenching simulators 56 and 58 are connected between second outer beam 40 and table top 18.

Third rod wrenching simulator 56 includes a lower simulator portion 60 and an upper simulator portion 62. Lower simulator portion 60 includes a first sucker rod portion 64 which is connected to table top 18 by first and second braces 66 and 68. The components of each of the rod wrenching simulators 52, 54, 56 and 58 are similarly numbered.

Referring to first rod wrenching simulator 52, the components of first sucker rod portion 64 may be most clearly described. The upper end of first sucker rod 64 includes a threaded pin connection 70 backed up by a flange 72. Below flange 72 is a square hammering shoulder 74 designed for engagement with a hammer rod wrench. Below hammer shoulder 74 is a flared shoulder portion 76.

The first sucker rod portion 64 is a portion of a conventional sucker rod which has been welded to the table top 18.

Similarly, upper simulator portion 62 includes a second sucker rod portion 78. The lower end of second sucker rod portion includeds a threaded pin 80, flange 82, square hammering shoulder 84 and flared shoulder 86.

The upper end of second sucker rod 78 includes an eyelet 88 to which is connected a resilient coil spring 90. The upper end of coil spring 90 is connected to a swivel means 92 which is in turn connected to an eyelet 94 attached to first end 48 of the outer beam 38. The pin connections 70 and 80 of first and second sucker rod portions 64 and 78 are threadedly connected by means of a rod box 96 which may be also referred to as a threaded female coupling.

The term rod means is hereinafter used to refer to either one of the rod portions 64 or 78 and will be understood to include such a rod with or without a rod box 96 connected thereto. It will therefore be understood that when a first and second rod means are engaged, this includes the use of a rod box 96.

The coil spring 90 may be referred to as support means 90 for supporting the second rod portion 78 from outer beam 46, so that the pin connection 80 of the lower end of second rod 78 may be engaged with and threadedly connected to the the upper end of first rod 64 by means of a rod box 96. The coil spring 98 is a resiliently extendable coil spring and is constructed so that when first rod 64 is made up with rod box 96 but second rod 78 is not yet connected thereto, as illustraed with regard to the third rod wrenching simulator 56, the pin 80 of second rod 78 is held suspended a short distance 98 above rod box 96. The distance 98 and the spring constant of spring 90 should be such that a man can grab second rod 78 and exert a very slight downward force thereon to engage pin 80 with rod box 96.

It will be understood that the rod box 96 may just as easily be made up to pin 80 so that it is necessary to pull second rod 78 downward so as to engage rod box 96 with the pin 70 of first rod 64.

The swivel means 92 is a conventional snap swivel which allows the upper simulator portion 62 to rotate about the longitudinal axis of second rod portion 78 relative to the frame 12.

The first rod wrenching simulator 52 is illustrated in the unconnected orientation and no rod box 96 is shown.

Second rod wrenching simulator 54 is shown in the connected orientation with the rod box 96 connected to both the first and second sucker rod portions 64 and 78.

The apparatus just described provides a very satisfactory means of simulating the field conditions present when a pump is being installed in a well so that a trainee may practice the assembly and disassembly of sucker rods. The training apparatus is so constructed so that up to four persons may practice the technique at one time. This allows the instructor to demonstrate the technique to his students and they at the same time can follow his actions and practice the technique.

Thus it is seen that the training apparatus of the present invention achieves the objects, ends and advantages mentioned as those inherent therein. While presently preferred embodiments of the invention have been described for the purpose of this disclosure, numerous changes in the arrangement and construction of parts may be made by those skilled in the art, which changes are encompassed within the spirit of this invention as defined by the appended claims.

What is claimed is:

1. A rod wrenching table for training persons to assemble threaded sucker rods to be installed in a well, comprising:
    a table having a planar horizontal top member with a ground engaging support extending downwardly therefrom;
    a column extending upward from said top member of said table;
    an intermediate beam connected to an upper end of said column and having first and second ends extending horizontally from said column;
    a first outer beam connected to said first end of said intermediate beam and having first and second ends extending horizontally from said intermediate beam;
    a second outer beam connected to said second end of said intermediate beam and having first and second ends extending horizontally from said intermediate beam; and
    first, second, third and fourth rod wrenching simulators, each of said rod wrenching simulators including a lower simulator portion connected to said top member of said table and an upper simulator portion connected to one of said ends of said first and second outer beams.

2. The rod wrenching table of claim 1, wherein:
    said lower simulator portion of said first rod wrenching simulator includes a first sucker rod portion having a threaded pin connection at an upper end thereof, said first sucker rod portion being fixedly attached to said top member of said table;
    said upper simulator portion of said first rod wrenching simulator includes:
        a swivel means attached to said first end of said first outer beam;
        a vertically extendable coil spring having an upper end connected to said swivel means so that said coil spring may rotate about a vertical axis relative to said first outer beam; and
        a second sucker rod portion having an upper end connected to a lower end of said coil spring and having a threaded pin connection at a lower end thereof; and
    said first rod wrenching simulator further includes a threaded rod box having a first end adapted for threaded connection to said threaded pin connection of said lower end of said second sucker rod portion and having a second end adapted for threaded connection to said threaded pin connection of said upper end of said first sucker rod portion.

3. The rod wrenching table of claim 2, wherein:
    said lower and upper simulator portions of said first rod wrenching simulator are so arranged and constructed that when said first and second sucker rod portions are not connected together said coil spring holds said second sucker rod portion suspended above said first sucker rod portion.

4. A training apparatus for training persons to assemble threaded rods to be installed in a well, said training apparatus comprising:
    a frame having a lower frame portion and an upper frame portion;
    a first threaded rod means connected to said lower frame portion and having an upper end extending upwardly therefrom;
    a second threaded rod means having a downwardly extending lower end; and
    support means for supporting said second threaded rod means from said upper frame portion so that said lower end of said second threaded rod means may be engaged with and threadedly connected to said upper end of said first threaded rod means, said support means including resiliently extendable means including a coil spring, connected between said upper frame portion and an upper end of said second threaded rod means, for holding said lower end of said second threaded rod means suspended above said upper end of said first threaded rod means and for allowing said second threaded rod means to be engaged with said first threaded rod means by an application of a downward force upon said second threaded rod means.

5. A training apparatus for training persons to assemble threaded rods to be installed in a well, said training apparatus comprising:
    a frame having a lower frame portion and an upper frame portion;
    a first threaded rod means connected to said lower frame portion and having an upper end extending upwardly therefrom;
    a second threaded rod means having a downwardly extending lower end; and
    support means for supporting said second threaded rod means from said upper frame portion so that said lower end of said second threaded rod means may be engaged with and threadedly connected to said upper end of said first threaded rod means, wherein said support means includes:
        resiliently extendable means, connected between said upper frame portion and an upper end of said second threaded rod means, for holding said lower end of said second threaded rod means suspended above said upper end of said first threaded rod means and for allowing said second threaded rod means to be engaged with said first threaded rod means by an application of a downward force upon said second threaded rod means; and swivel means, connected between said upper frame portion and an upper end of said resiliently extendable means, for allowing said second threaded rod means to be rotated about its longitudinal axis.

6. A training apparatus for training persons to assemble threaded rods to be installed in a well, said training apparatus comprising:

a frame having a lower frame portion and an upper frame portion;

a first threaded rod means connected to said lower frame portion and having an upper end extending upwardly therefrom;

a second threaded rod means having a downwardly extending lower end; and support means for supporting said second threaded rod means from said upper frame portion so that said lower end of said second threaded rod means may be engaged with and threadedly connected to said upper end of said first threaded rod means, wherein said support means includes:

resilient spring means connected between said upper frame portion and said second threaded rod means; and swivel means connected between said upper frame portion and an upper end of said resilient spring means.

7. A training apparatus for training persons to assemble threaded rods to be installed in a well, said training apparatus comprising:

a frame having a lower frame portion and an upper frame portion;

a first threaded rod means connected to said lower frame portion and having an upper end extending upwardly therefrom;

a second threaded rod means having a downwardly extending lower end; and support means for supporting said second threaded rod means from said upper frame portion so that said lower end of said second threaded rod means may be engaged with and threadedly connected to said upper end of said first threaded rod means, wherein;

said lower frame portion includes a table;

said upper frame portion includes a column extending upward from said table and a beam means extending horizontally from an upper part of said column; and said support means is further characterized as being a means for supporting said second threaded rod means from said beam means.

8. A training apparatus for training persons to assemble threaded sucker rods to be installed in a well, said training apparatus comprising:

a frame having a lower frame portion and an upper frame portion;

a first threaded rod means, including a first sucker rod segment cut from a sucker rod and having a lower cut end thereof fixedly attached to said lower frame portion and having an upper end thereof including a sucker rod pin end extending upwardly from said lower frame portion, for simulating a first sucker rod suspended in a well by a first elevator;

a second threaded rod means, including a second sucker rod segment cut from a sucker rod and having an upper cut end thereof supported from said upper frame portion and having a lower end thereof including a sucker rod pin end extending downwardly, for simulating a second sucker rod suspended above a well by a second elevator; and support means for supporting said second threaded rod means from said upper frame portion, said support means including a spring means and a swivel means connected between said upper frame portion and said upper cut end of said second sucker rod segment for simulating said second elevator and a means by which said second elevator is suspended from a derrick above said well, so that said lower end of said second sucker rod segment may be engaged with and threadedly connected to said upper end of said first sucker rod segment to simulate connecting of said first and second sucker rods at a well.

* * * * *